United States Patent
Nakamura et al.

(10) Patent No.: US 9,124,742 B2
(45) Date of Patent: Sep. 1, 2015

(54) IMAGE READING DEVICE

(71) Applicant: CANON FINETECH INC., Misato-shi, Saitama-ken (JP)

(72) Inventors: Takatsugu Nakamura, Kitakatsushika-gun (JP); Takeshi Sasaki, Tsukuba (JP)

(73) Assignee: CANON FINETECH INC., Saitama-ken (JP)

( * ) Notice: Subject to any disclaimer, the term of this patent is extended or adjusted under 35 U.S.C. 154(b) by 0 days.

(21) Appl. No.: 13/739,625

(22) Filed: Jan. 11, 2013

(65) Prior Publication Data
US 2013/0182297 A1 Jul. 18, 2013

(30) Foreign Application Priority Data

Jan. 13, 2012 (JP) ................................. 2012-005051
Nov. 28, 2012 (JP) ................................. 2012-259537

(51) Int. Cl.
H04N 1/04 (2006.01)
H04N 1/00 (2006.01)
H04N 1/10 (2006.01)

(52) U.S. Cl.
CPC ........... *H04N 1/00549* (2013.01); *H04N 1/103* (2013.01)

(58) Field of Classification Search
CPC ... H04N 1/193; H04N 1/1017; H04N 1/1013; H04N 2201/1016; H04N 2201/0425; H04N 1/12; H04N 1/113; H04N 2201/1933
USPC ......... 358/497, 494, 474, 471, 400, 500, 483, 358/482, 505; 250/208.1, 239, 234–236; 399/211, 212
See application file for complete search history.

(56) References Cited

U.S. PATENT DOCUMENTS

| 4,714,354 A | 12/1987 | Satomi |
| 6,115,109 A | 9/2000 | Cooper |
| 7,486,423 B2 * | 2/2009 | Chang et al. ................... 358/497 |
| 7,768,679 B2 * | 8/2010 | Yamaguchi ................... 358/497 |

(Continued)

FOREIGN PATENT DOCUMENTS

| JP | 61-158349 A | 7/1986 |
| JP | 61-158350 A | 7/1986 |

(Continued)

OTHER PUBLICATIONS

Search Report issued in European Patent Office Application No. 13150927.5, dated Mar. 11, 2013.

(Continued)

*Primary Examiner* — Cheukfan Lee
(74) *Attorney, Agent, or Firm* — Fitzpatrick, Cella, Harper & Scinto

(57) ABSTRACT

Provided is a structure capable of preventing shaking of an image reading unit (1) during movement at low cost. A first contact portion (T1) between the image reading unit (1) and a guide shaft (2A) supports force (F1) acting in a gravity direction and force (F2) acting in a horizontal direction in the case where the image reading unit (1) moves in a predetermined direction. In this case, the first contact portion is arranged so as to satisfy F1>F2×tan θ1, where θ1 represents an angle formed by a perpendicular line (γ) with respect to a tangential plane (β) of the guide shaft (2A) and the horizontal direction. Thus, the image reading unit (1) can be prevented from being lifted due to rotation moment during movement.

10 Claims, 7 Drawing Sheets

(56) References Cited

U.S. PATENT DOCUMENTS

| | | | |
|---|---|---|---|
| 8,289,587 B2 * | 10/2012 | Yamauchi | ................. 358/497 |
| 2002/0075495 A1 | 6/2002 | Ikeda et al. | |
| 2006/0203300 A1 | 9/2006 | Choi | |
| 2009/0109499 A1 | 4/2009 | Smith et al. | |
| 2009/0190190 A1 | 7/2009 | Yamauchi | |
| 2011/0299133 A1 | 12/2011 | Wang | |

FOREIGN PATENT DOCUMENTS

| | | |
|---|---|---|
| JP | 2002-137481 A | 5/2002 |
| JP | 2006-258968 A | 9/2006 |
| JP | 2010-109399 A | 5/2010 |

OTHER PUBLICATIONS

Office Action mailed Dec. 17, 2013, Japanese Patent Application No. 2012-259537, Japanese Patent Office.

* cited by examiner

IMAGE READING DEVICE

BACKGROUND OF THE INVENTION

1. Field of the Invention

The present invention relates to an image reading device for reading an image by moving an image reading unit along a guide shaft.

2. Description of the Related Art

An image reading device (scanner) reads an image of a document and outputs image information to an office machine such as a computer or an image forming apparatus. The image reading device is mounted on an image forming apparatus such as a printer, a fax machine, a copier, or a multifunction machine thereof, or connected to any of those image forming apparatuses as a purchase choice (so-called option).

Reading of an image of a document is performed as follows. An image reading unit is moved along a document while the document is being irradiated with light for reading by a light source placed on the image reading unit (image sensor) or in the vicinity of the image reading unit in which a light-receiving sensor is arranged. At this time, reflected light is guided to the light-receiving sensor by a mirror, and photoelectric conversion is performed in the light-receiving sensor. In this manner, an image of the document is read. The image reading unit is moved by driving of a drive member such as a motor along a guide member such as a guide shaft placed in a predetermined direction.

In the case where the image reading unit moves on the guide shaft, there is a possibility that the moving speed may be irregular due to vibration of the drive member or sliding performance of a sliding portion between the unit and the guide member. In this case, vibration, lateral shaking, chattering, or the like occurs in the image reading unit to degrade quality and resolution of a read image. Therefore, there is a demand for suppressing the occurrence of vibration, lateral shaking, and the like in the drive member and the sliding portion between the unit and the guide member. Further, in recent years, in spite of the fact that image forming apparatus are becoming less expensive, there is an increasing demand for further decreasing vibration, lateral shaking, and the like along with an increase in demand for a high-resolution and high-quality read image.

There has been proposed a structure in which a groove is formed over an entire sliding surface that slides on a guide shaft of an image reading unit to suppress movement to one side and shortage of lubricating grease applied between the sliding surface and the guide shaft, thereby solving the problems of lateral shaking and irregular moving speed of the image reading unit (Japanese Patent Application Laid-Open No. 2006-258968).

There has also been proposed a structure for moving an image reading unit by pulling the image reading unit with a belt, in which a hook portion is provided at a position away from a portion where the belt is fixed to the image reading unit, and the belt is hooked on the hook portion (Japanese Patent Application Laid-Open No. 2010-109399). In the case of the structure described in Japanese Patent Application Laid-Open No. 2010-109399, the belt is hooked on the hook portion, and hence, rotation moment based on tension of the belt occurs. Consequently, a bearing surface of the image reading unit is pressed against a guide rail (guide member), thereby suppressing shaking of the image reading unit during movement.

In the case of the structure described in Japanese Patent Application Laid-Open No. 2006-258968, the vicinity of a top of the groove and the guide shaft are brought into contact at one place in the groove of the sliding surface of the image reading unit. Therefore, in the case where rotation moment acts on the image reading unit during movement of the image reading unit, the contact point between the groove and the guide shaft moves due to the rotation moment. Consequently, the image reading unit is lifted slightly and then falls repeatedly. It is difficult to suppress image blur involved in shaking of the image reading unit which is caused by the repeated lifting and falling of the image reading unit.

In the case of the structure described in Japanese Patent Application Laid-Open No. 2010-109399, it is necessary that the bearing surface be biased to the guide rail by the tension of the belt consistently during movement of the image reading unit. Therefore, it is necessary to provide a guide surface for guiding the belt also on the periphery of the hook portion. Consequently, assembling the image reading unit becomes cumbersome, and production cost rises. Further, a contact area between the bearing surface and the guide rail is large, and hence, when the image reading unit is moved while the bearing surface is biased to the guide rail, a resistance of the movement increases. This makes it necessary to use a high-power motor so as to obtain large torque, which not only raises cost but also increases vibration by the motor, with the result that image blur may not be suppressed easily.

SUMMARY OF THE INVENTION

In view of the above-mentioned problems, the present invention has been achieved so as to realize a structure capable of suppressing shaking of an image reading unit during movement at low cost.

According to an exemplary embodiment of the present invention, there is provided an image reading device, including: an image reading unit configured to move in a predetermined direction to read an image; a guide shaft arranged in the predetermined direction and guiding movement of the image reading unit, the guide shaft including at least a partial cylindrical surface on an outer circumference thereof in a movement range of the image reading unit; a driving device including a tension member to be connected to the image reading unit, the driving device pulling the tension member to move the image reading unit along the guide shaft; the image reading unit including, at a position displaced from the guide shaft at least in a horizontal direction with respect to the predetermined direction, a connecting portion to be connected to the tension member and a sliding portion to slide on the guide shaft; the sliding portion including a first contact portion and a second contact portion that come into point contact or line contact with the partial cylindrical surface of the guide shaft above a center axis of the guide shaft in a gravity direction and on both sides with respect to a vertical plane including the center axis of the guide shaft; and the first contact portion arranged so as to satisfy $F1 > F2 \times \tan\theta1$, where $F1$ represents force acting in the gravity direction of the image reading unit and $F2$ represents force acting in a horizontal direction of the image reading unit in a case where the image reading unit moves in the predetermined direction, and $\theta1$ represents an angle formed by a perpendicular line with respect to a tangential plane of the guide shaft and the horizontal direction.

According to the present invention, shaking of the image reading unit during movement can be suppressed at low cost. That is, the force in the horizontal direction acts due to rotation moment during movement of the image reading unit, and hence, the sliding portion is pressed against the guide shaft. At this time, the first contact portion supporting the force $F2$ in the horizontal direction is arranged so as to satisfy $F1 > F2 \times \tan$ θ1, and hence, the force F2 can prevent the image reading unit from being lifted and the shaking of the image reading unit can be suppressed. Further, the shaking of the image reading unit can be suppressed during movement at low cost by merely regulating the position of the first contact portion, because the first contact portion is in point contact or line contact.

Further features of the present invention will become apparent from the following description of exemplary embodiments with reference to the attached drawings.

DESCRIPTION OF THE EMBODIMENTS

First Embodiment

Figure 1:
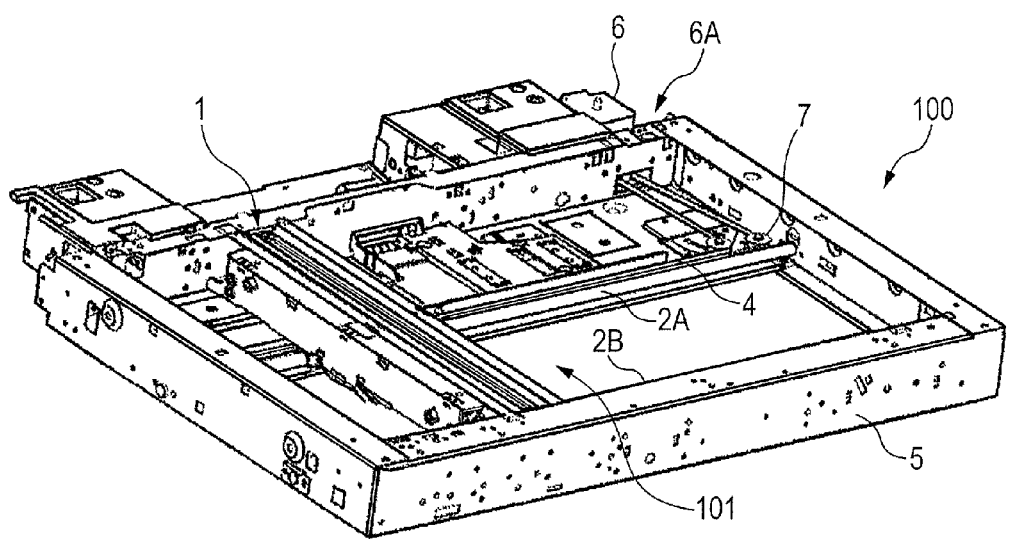
FIG. 1 is a schematic structural perspective view of an image reading device according to a first embodiment of the present invention.

A first embodiment of the present invention is described with reference to FIGS. 1 to 7. First, a schematic configuration of an image reading device is described with reference to FIGS. 1 to 3.

Image Reading Device

An image reading device 100 includes a moving device 101 in a frame 5. The moving device 101 moves an image reading unit 1, which is a movement unit, in the frame 5. The image reading unit 1 mounted inside the frame 5 is arranged on a lower side of a platen glass (not shown) to be set on the frame 5, and moves in a predetermined direction along the platen glass. The image reading unit 1 successively reads an image on a document placed with its face down on the platen glass in a direction orthogonal to the movement direction (predetermined direction) while moving on the lower side of the platen glass. In this case, the direction orthogonal to the movement direction of the image reading unit 1 is referred to as a main scanning direction, and the movement direction is referred to as a sub-scanning direction.

The image of the document is read by the image reading unit 1 as follows. First, the image reading unit 1 is moved in a predetermined direction while a document is irradiated with light for reading by a light source arranged on the image reading unit 1 or in the vicinity of the image reading unit 1. The irradiated light is reflected from a document surface, and at least part of the reflected light enters a housing of the image reading unit 1. Then, the light is reflected by some mirrors in the housing to adjust a path of luminous flux, and is guided to a lens that is an imaging unit.

The number and positions of the mirrors, a reflection angle, a length of an optical path, and the like are set appropriately depending upon the entire size of the image reading device 100, lens characteristics, and a light amount of illumination. The same applies to an image reading device having a system which reads an image in a main scanning direction and reads the image while moving in a sub-scanning direction, as well as the image reading unit 1.

The luminous flux having passed through the lens forms an image on a light-receiving surface of a CCD sensor that is a light-receiving sensor. The CCD sensor includes photoelectric conversion elements arranged in the main scanning direction. The light-receiving surface of the CCD sensor has a longitudinal direction in the main scanning direction, and receives, as a light amount, information in the main scanning direction of the document in accordance with the illumination illuminating the document in the main scanning direction. Then, the received light amount is stored in a photoelectric conversion unit and the light amount is changed into a charge amount to be transferred as image information. Thus, the image of the document can be read.

Incident surfaces of the photoelectric conversion elements are coated with color filters based on color information to be read, which are arranged respectively in a vertical direction. A position of the light-receiving surface of the CCD sensor is appropriately adjusted substantially at a focus position of a lens, considering a focus variation of the lens to be used, a variation of a holding member, a mounting variation of the CCD sensor, and the like. The reflected light from the document, which has been subjected to imaging by the lens, is received by the light-receiving surface of the CCD sensor, and the intensity of the light is converted into an electric signal. After that, the image information that has become the electric signal becomes a read image through a software-like image processing unit.

Moving Device

Figure 2:
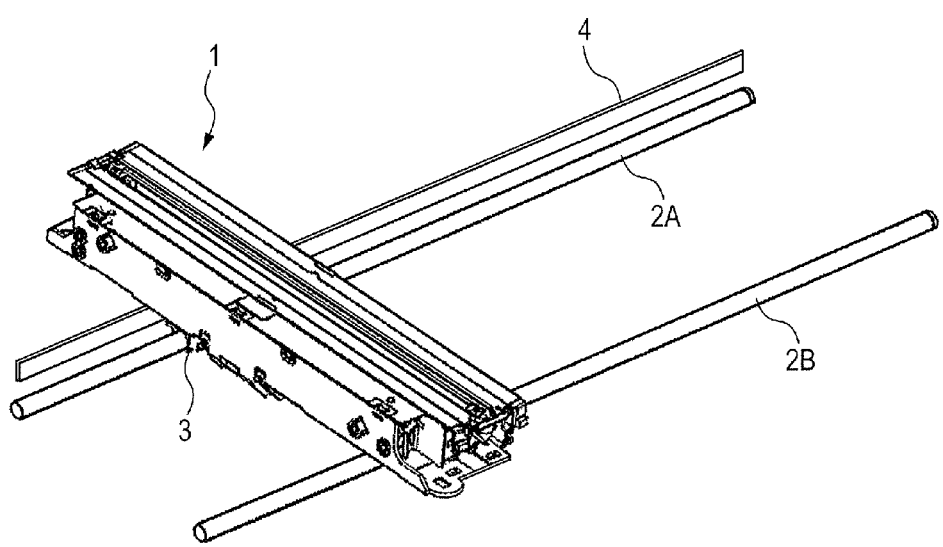
FIG. 2 is a perspective view illustrating an image reading unit and a guide shaft of the image reading device.

The moving device 101 for moving the image reading unit 1 includes guide shafts 2A and 2B and a driving device 6A in addition to the image reading unit 1. The guide shafts 2A and 2B are arranged in the frame 5 having a substantially rectangular shape in parallel with each other in a longitudinal direction of the frame 5. In this embodiment, the longitudinal direction of the frame 5 is the sub-scanning direction (predetermined direction) that is the movement direction of the image reading unit 1. Further, two guide shafts 2A and 2B are used. The guide shafts 2A and 2B each have an outer circumference designed as at least a partially cylindrical surface in a movement range of the image reading unit 1. In this embodiment, as illustrated in FIG. 2, the outer circumferential surface is designed as a cylindrical surface along the entire shaft direction. The image reading unit 1 is arranged so as to be mounted on such guide shafts 2A and 2B.

Figure 3:
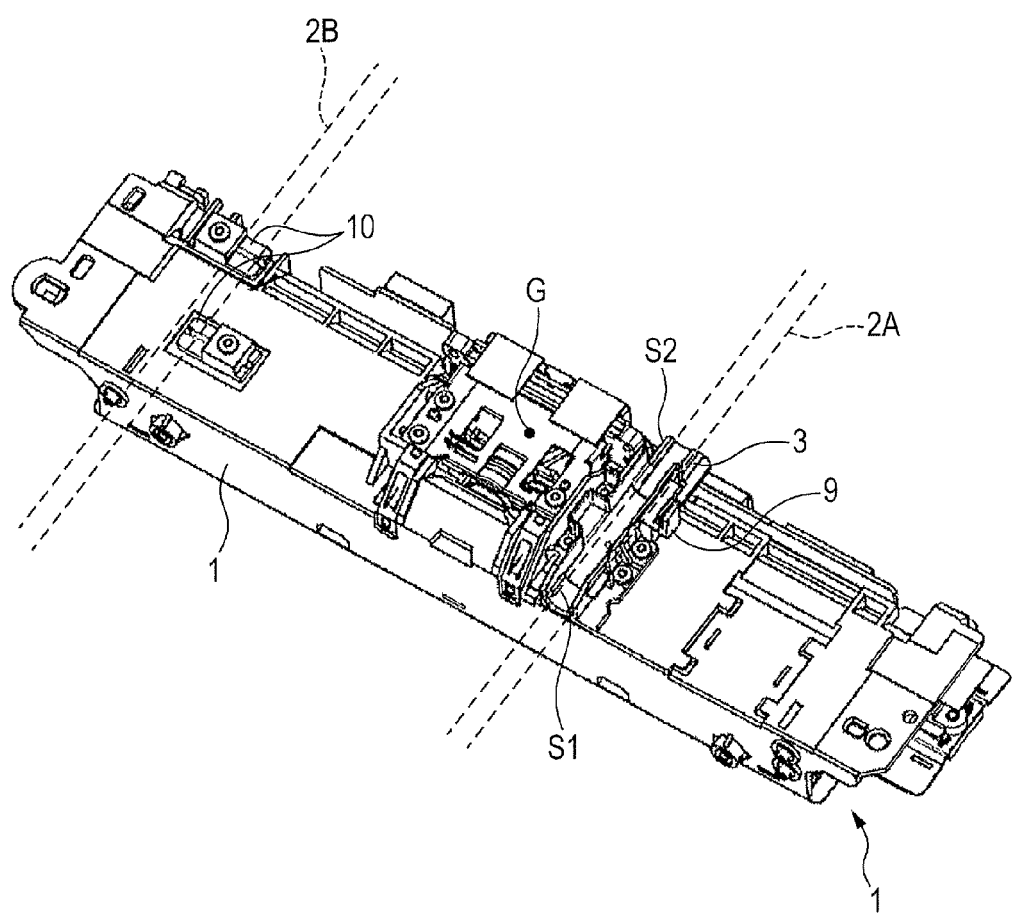
FIG. 3 is a perspective view of the image reading unit, when viewed from below in FIG. 2.

As illustrated in FIG. 3 in which the image reading unit of FIG. 2 is viewed from below (bottom surface side), a bearing member 3 fixed to a bottom surface of the image reading unit 1 is mounted slidably on one guide shaft 2A. Further, a slide portion 10 provided on the bottom surface of the image reading unit 1 is slidably mounted on the other guide shaft 2B. The bearing member 3 has multiple (two or more) contact portions except for a top (highest portion in a gravity direction) of the guide shaft 2A, and supports a force in the gravity direction and a force in a horizontal direction of the image reading unit 1. The slide portion 10 is held in contact with the top of the guide shaft 2B to support the force in the gravity direction of the image reading unit 1. That is, the image reading unit 1 is supported in the gravity direction by the bearing member 3 and the slide portion 10, and its movement is regulated by the bearing member 3 in the horizontal direction.

In this embodiment, the outer circumferences of the guide shafts 2A and 2B are each designed to be a cylindrical surface. However, a contact portion with respect to the bearing member 3 may be designed to be a partially cylindrical surface, and the other portion may be designed to be a plane. For example, an upper side portion in the gravity direction of the guide shaft having the contact portion is designed to be a partially cylindrical surface so as to have a semi-circular shape in cross-section, and a lower side portion thereof is designed to have a rectangular shape in cross-section. Further, although it is preferred that the guide shaft 2B have the same shape as that of the guide shaft 2A, the guide shafts may have different shapes.

Figure 4:
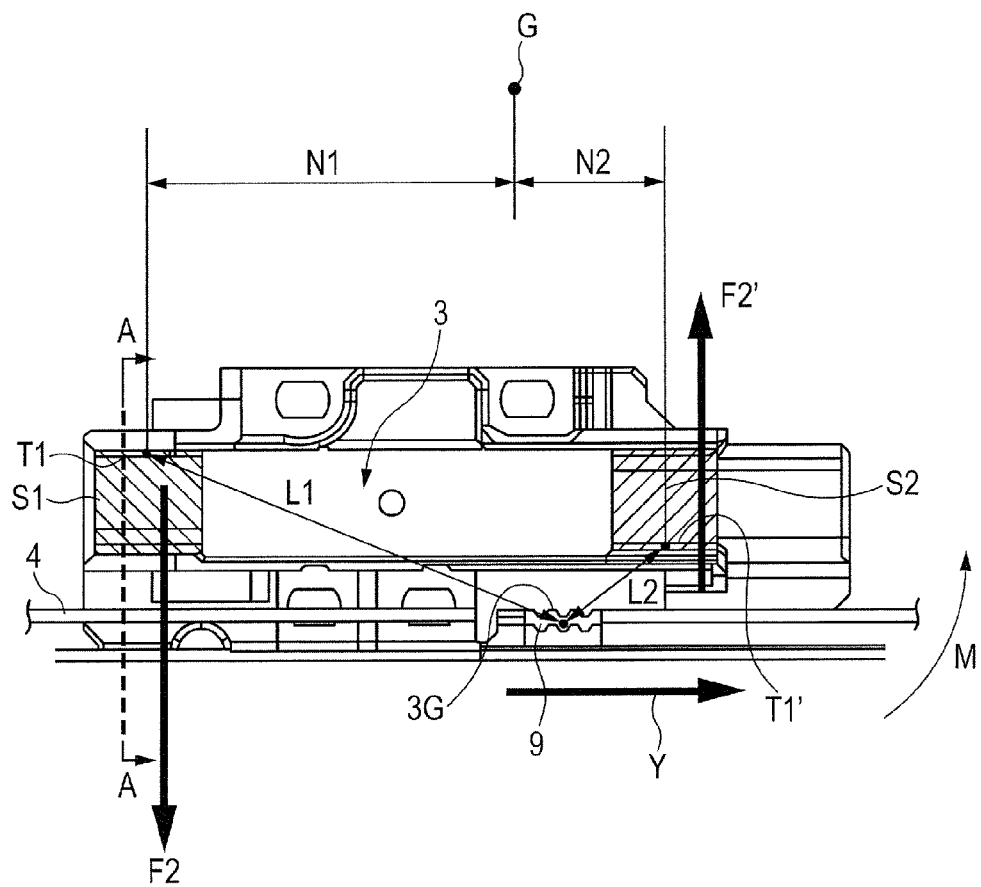
FIG. 4 is a plan view of a sliding portion with respect to the guide shaft of the image reading unit, when viewed from below in FIG. 2.

The driving device 6A moves the image reading unit 1 along the guide shafts 2A and 2B, and includes a driving belt 4 that is a tension member, a motor 6, and a pulley 7. The driving belt 4 has an endless shape and is arranged so as to extend along the guide shaft 2A in the vicinity of the guide shaft 2A. As illustrated in FIG. 4, a part of the driving belt 4 is fixed to a connecting portion 9 provided at a position of the image reading unit 1, at which the driving belt 4 is arranged. Therefore, the connecting portion 9 is present at a position displaced from the guide shaft 2A at least in the horizontal direction with respect to the predetermined direction (sub-scanning direction), and at this position, the connecting portion 9 is connected to the driving belt 4. For example, a tooth plane provided on the driving belt 4 is fitted in a fitting portion 3G provided on the bearing member 3 of the image reading unit 1 to engage both members with each other, and thus the driving belt 4 is fixed to the connecting portion 9.

The driving belt 4 is suspended around an output shaft of the motor 6 via the pulley 7 and moved so as to circulate due to rotation drive force of the motor 6 that is rotating normally and reversely. Due to the circulation movement, the image reading unit 1 is pulled by the driving belt 4 and moves in the frame 5 while reading a document in the sub-scanning direction, using the guide shafts 2A and 2B as guides.

Bearing Member

Next, a configuration of the bearing member 3 for guiding the image reading unit 1 along the guide shaft 2A is described in more detail. As illustrated in shaded areas of FIG. 4, the bearing member 3 in the case where the image reading unit of FIG. 2 is viewed from below (bottom surface side) includes a first sliding portion S1 and a second sliding portion S2 which are placed at a distance in the predetermined direction (sub-scanning direction) and which slide against the guide shaft A. In this embodiment, the first sliding portion S1 and the second sliding portion S2 are arranged on both sides (both sides in the predetermined direction) with respect to the connecting portion 9 in the sub-scanning direction.

Figure 5A:
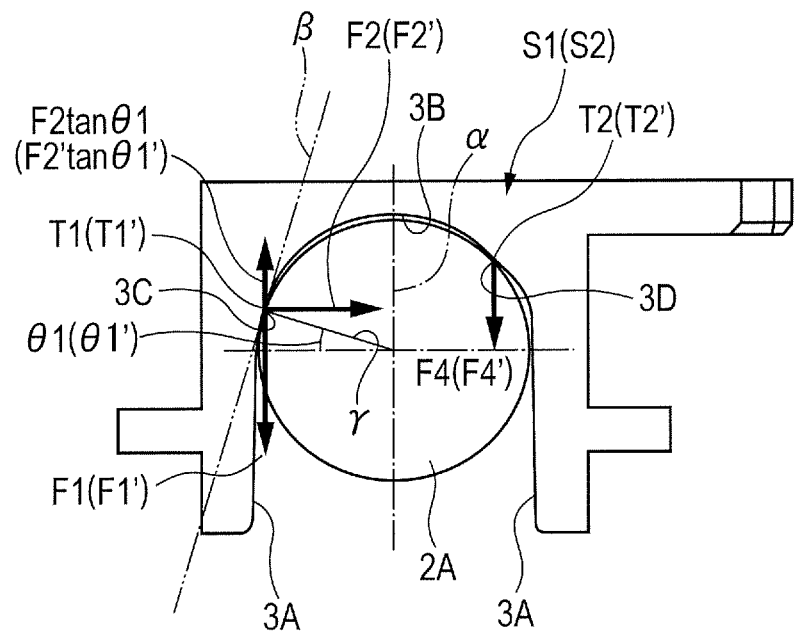
FIG. 5A is a cross-sectional view taken along the line A-A of FIG. 4, illustrating forces acting on a first contact portion and a second contact portion during movement of the image reading unit
Figure 5B:
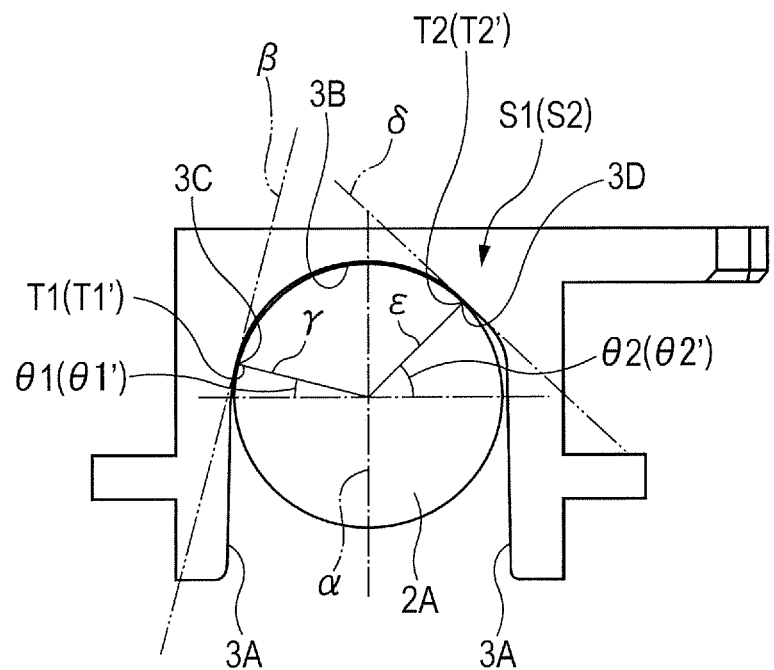
FIG. 5B is a cross-sectional view taken along the line A-A of FIG. 4, illustrating the first contact portion and the second contact portion.

The first sliding portion S1 and the second sliding portion S2 respectively have multiple contact portions that come into point or line contact with the outer circumferential surface (partially cylindrical surface if the outer circumference has a partially cylindrical surface) of the guide shaft 2A in two or more portions. Further, in a setting condition with respect to the guide shaft 2A, the first sliding portion S1 and the second sliding portion S2 respectively have multiple contact portions which are positioned above a center axis of the guide shaft 2A in the gravity direction. In this embodiment, as illustrated in FIGS. 5A and 5B, the first sliding portion S1 (second sliding portion S2) includes a first contact portion T1 (T1') and a second contact portion T2 (T2'). The first contact portion T1 (T1') and the second contact portion T2 (T2') come into point or line contact with the outer circumferential surface of the guide shaft 2A above the center axis of the guide shaft 2A in the gravity direction and on both sides with respect to a vertical surface (virtual plane a in the gravity direction) including the center axis of the guide shaft 2A.

The first sliding portion S1 and the second sliding portion S2 are arranged on both sides with respect to the connecting portion 9 in the sub-scanning direction, and hence, rotation moment involved in the movement of the image reading unit 1 described later acts in an opposite direction. Therefore, the first contact portion T1 and the second contact portion T2 are formed so as to be opposite in the right and left direction of FIGS. 5A and 5B between the first sliding portion S1 and the second sliding portion S2. The first sliding portion S1 is mainly described hereinafter with reference to FIGS. 5A, 5B and 5C. Reference symbols denoted in parentheses in FIGS. 5A, 5B and 5C correspond to the second sliding portion S2.

Figure 5C:
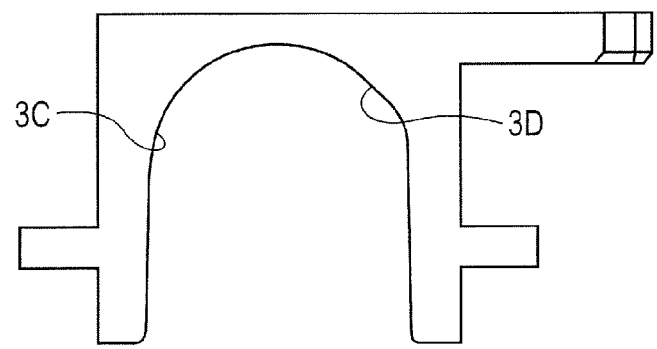
FIG. 5C is a cross-sectional view taken along the line A-A of FIG. 4, illustrating protruding portions (protruding lines) by omitting a guide shaft.

As illustrated in FIGS. 5A, 5B and 5C, the first sliding portion S1 includes a pair of guide surfaces 3A on a lower side in the gravity direction in a setting condition, and a cylindrical surface 3B having a substantially cylindrical shape formed so as to connect upper ends in the gravity direction of both the guide surfaces 3A. The pair of guide surfaces 3A has an interval therebetween larger than a diameter of the guide shaft 2A so that the guide shaft 2A passes through between the guide surfaces 3A. In two portions in a circumferential direction of the cylindrical surface 3B, protruding portions (or protruding lines) 3C and 3D protruding inward in a radial direction are formed. In the case of the protruding lines, the protruding lines are formed in parallel with the center axis direction of the guide shaft 2A. Further, in the case of the protruding portions, multiple protruding portions may be formed in the center axis direction at the same position in the circumferential direction. In the setting condition with respect to the guide shaft 2A, the protruding portions (or protruding lines) 3C and 3D are arranged so as to sandwich the virtual plane α (vertical plane) in the gravity direction, and the virtual plane α passes through the center axis of the guide shaft 2A. Further, the protruding portions (or protruding lines) 3C and 3D are positioned above the center axis of the guide shaft 2A in the gravity direction in the setting condition with respect to the guide shaft 2A.

When the image reading unit 1 is mounted on the guide shaft 2A, the guide shaft 2A is allowed to pass through between both the guide surfaces 3A so that the outer circumferential surface of the guide shaft 2A comes into contact with the protruding portions (or protruding lines) 3C and 3D. At this time, the protruding portions 3C and 3D come into point contact with the outer circumferential surface of the guide shaft 2A (in the case of the protruding lines, the protruding lines come into line contact with the outer circumferential surface in the guide shaft direction). The contact portion with the protruding portion 3C becomes the first contact portion T1 (T1'), and the contact portion with the protruding portion 3D becomes the second contact portion T2 (T2').

The connecting portion 9 between the driving belt and the bearing member 3 is present at a position displaced from the guide shaft 2A in the horizontal direction with respect to the predetermined direction (sub-scanning direction). Therefore, as illustrated in FIG. 4, during movement of the image reading unit 1, rotation moment M is generated about the connecting portion 9. Then, force F2 in the horizontal direction acts on the first sliding portion S1, and force F2' in the horizontal direction opposite to the force F2 acts on the second sliding portion S2, respectively. Consequently, in the first sliding portion S1, as illustrated in FIG. 5A, the force F1 in the gravity direction and the force F2 in the horizontal direction act on the first contact portion T1. Force F4 in the gravity direction acts on the second contact portion T2 positioned on a side opposite to a side on which the force F2 acts. In the second sliding portion S2, force F1' in the gravity direction and force F2' in the horizontal direction act on the first contact portion T1'. Force F4' in the gravity direction acts on the second contact portion T2' positioned on a side opposite to a side on which the force F2' acts.

Figure 6:
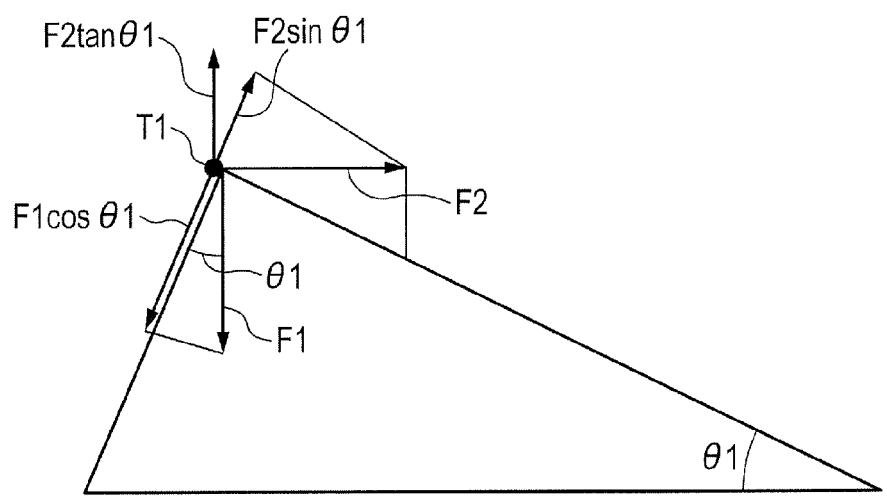
FIG. 6 illustrates force acting on the first contact portion and force in a tangential direction in the first contact portion.

That is, the first contact portions T1 and T1' of the respective first sliding portion S1 and second sliding portion S2 are arranged on a side supporting the moment M acting about the connecting portion 9, in the case where the image reading unit 1 moves in the predetermined direction (arrow Y-direction of FIG. 4). In the case of this embodiment, the first contact portion T1 of the first sliding portion S1 is arranged so as to satisfy F1>F2×tan θ1, where θ1 represents an angle formed by a perpendicular line γ with respect to a tangential plane β of the guide shaft 2A and the horizontal direction. Further, the first contact portion T1' of the second sliding portion S2 is arranged so as to satisfy F1'>F2'×tan θ1', where θ1' represents an angle formed by the perpendicular line γ with respect to the tangential plane β of the guide shaft 2A and the horizontal direction. This point is described with reference to FIG. 6. In FIG. 6, although the first contact portion T1 of the first sliding portion S1 is described, the same applies to the first contact portion T1' of the second sliding portion S2.

As illustrated in FIG. 6, F1×cos θ1 and F2×sin θ1 act in the tangential direction of the first contact portion T1. At this time, when F2×sin θ1 is larger than F1×cos θ1, that is, when F1×cos θ1<F2×sin θ1 (F1<F2×tan θ1), the image reading unit 1 is operated to be lifted upward. Consequently, lateral shaking occurs easily during movement of the image reading unit 1, which makes it difficult to read an image stably. In this embodiment, by arranging the first contact portion T1 so as to satisfy F1>F2×tan θ1, the image reading unit 1 can be prevented from being operated to be lifted during movement. In the case where multiple contact portions are present on a side on which the rotation moment of the sliding surface between the bearing member 3 and the guide shaft 2A acts, F1>F2×tan θ1 can be satisfied in each contact portion. Note that, in this case, if the image reading unit 1 can be prevented from being lifted, F1>F2×tan θ1 may not be satisfied in a part of the contact portions.

A magnitude of the force F1 varies mainly depending upon a weight of the image reading unit 1 and a distance in a predetermined direction from a center of gravity G although there may be a force component in the vertical direction of the rotation moment. That is, as the distance from the center of gravity G becomes shorter, the force F1 tends to increase. The magnitude of the force F2 increases in proportion with the distance from the connecting portion 9 to the sliding surface. Therefore, the lifting due to the rotation moment can be prevented when the angle θ1 is as small as possible although the optimum value thereof varies depending upon the condition. At least in the case where the force F1 is equal to or higher than the force F2, θ1 is set to less than 45°.

Figure 7:
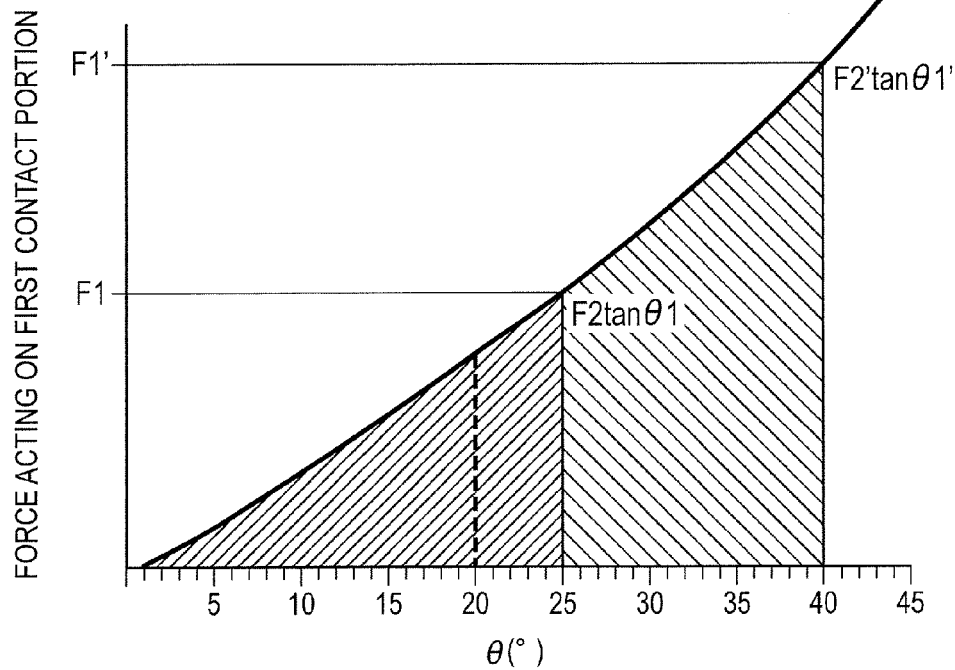
FIG. 7 is a graph illustrating a relationship between angles θ1, θ1' formed by a perpendicular line with respect to a tangential plane of the first contact portion and a horizontal direction, and a force acting on the first contact portion.

Description is made more specifically with reference to FIG. 7 while referring to FIG. 4. In the case of this embodiment, as illustrated in FIG. 4, the first sliding portion S1 has the first contact portion T1 which is farther away from the connecting portion 9 as compared to that of the second sliding portion S2, and is also farther away from the center of gravity G in the predetermined direction. That is, L1>L2 is satisfied, where L1 represents a distance between the first contact portion T1 of the first sliding portion S1 and the connecting portion 9, and L2 represents a distance between the first contact portion T1' of the second sliding portion S2 and the connecting portion 9. Further, N1>N2 is satisfied, where N1 represents a distance in the predetermined direction (Y) between the first contact portion T1 of the first sliding portion S1 and the center of gravity G of the image reading unit 1, and N2 represents a distance in the predetermined direction between the first contact portion T1' of the second sliding portion S2 and the center of gravity G. The respective distances are distances from a center position in the predetermined direction of each contact portion and are also distances from a center position in the predetermined direction of the connecting portion 9.

The force F2 based on the moment acting about the connecting portion 9 becomes large in the first contact portion T1 of the first sliding portion S1 far away from the connecting portion 9. The distance of the first sliding portion S1 from the center of gravity G is large, and hence the force F1 based on the gravity becomes small. Thus, the condition for satisfying F1>F2×tan θ1 in the first contact portion T1 of the first sliding portion S1 becomes strict. In contrast, the condition for satisfying F1'>F2'×tan θ1' in the first contact portion T1' of the second sliding portion S2 is alleviated because the force F2' becomes smaller and the force F1' becomes larger relative to the first sliding portion S1.

θ1 of the first contact portion T1 of the first sliding portion S1 and θ1' of the first contact portion T1' of the second sliding portion S2 may be the same or different from each other. In the case of this embodiment, a relationship between F1 and F2×tan θ1 regarding the first sliding portion S1 and a relationship between F1' and F2'×tan θ1' regarding the second sliding portion S2 are as shown in FIG. 7. That is, the condition for satisfying the above-mentioned expression is less strict in the second sliding portion S2, and hence the angle θ1' can be set in a wider range. In this embodiment, as shown in FIG. 7, F1'>F2'×tan θ1' can be satisfied in a range of 1° to 40°. On the other hand, in the first sliding portion S1, the condition for satisfying the above-mentioned expression is more strict, and hence F1>F2×tan θ1 cannot be satisfied in a range of 25° to 40°.

In the case where θ1 is equal to θ1' (θ1=θ1'), if θ1 is set so as to satisfy F1>F2×tan θ1 of the first sliding portion S1 whose condition is more strict, F1'>F2'×tan θ1' can also be satisfied in the second sliding portion S2. For example, when θ1=θ1'=20° is established, the above-mentioned expressions can be satisfied respectively in the first sliding portion S1 and the second sliding portion S2.

In the case where θ1 is set to be different from θ1', θ1 and θ1' only need to be set so as to satisfy the above-mentioned expressions in the respective sliding portions. For example, θ1 is set to 20°, and θ1' is set to 35°. Note that, L1>L2 is established and the force F2 based on the moment acting on the first contact portion T1 of the first sliding portion S1 is large, and hence θ1 and θ1' are set so as to be θ1<θ1'. Further, N1>N2 is established and the force F1 based on the gravity acting on the first sliding portion S1 is small, and hence θ1 and θ1' are set so as to be θ1<θ1'. That is, in the sliding portion on the side on which the force F2 becomes large or the force F1 becomes small, an angle with respect to the vertical direction of the contact portion is set to be small (is set to be acute). In this manner, the sliding portion receives a force in the horizontal direction on a substantially perpendicular wall. In summary, in the case where L1>L2 is established, θ1≤θ1' is set to be satisfied. In the case where N1>N2 is established, θ1≤θ1' is also set to be satisfied.

In the case where L1>L2 and N1<N2 are established or L1<L2 and N1>N2 are established, considering the forces F1 and F1' based on the gravity and the forces F2 and F2' based on the moment, θ1 and θ1' are appropriately set so as to satisfy the above-mentioned expressions. In the case where L1<L2 and N1<N2 are established, in the above-mentioned description, L1 and L2 are respectively replaced with N1 and N2. That is, in the case where L1<L2 and N1<N2 are established, θ1≥θ1' is satisfied. In the case where L1>L2 and N1=N2 are established or L1=L2 and N1>N2 are established, θ1≤θ1' is set to be satisfied. In the case where L1=L2 and N1=N2 are established, θ1 and θ1' can be set so as to be θ1=θ1'.

When θ1 (θ1') is decreased, in the case where a positional relationship with the second contact portion T2 (T2') is slightly shifted due to dimension tolerance, the image reading unit 1 may be displaced greatly in a height direction (gravity direction). When the image reading unit 1 is displaced greatly, a distance from the image reading unit 1 to a document changes to shift a focus. In the case of this embodiment, the second contact portion T2 of the first sliding portion S1 is arranged so as to satisfy θ2>θ1, where θ2 represents an angle formed by a perpendicular line ε with respect to a tangential plane δ (FIG. 5B) of the guide shaft 2A and the horizontal direction. The second contact portion T2' of the second sliding portion S2 is arranged so as to satisfy θ2'>θ1', where θ2' represents an angle formed by the perpendicular line ε with respect to the tangential plane δ of the guide shaft 2A and the horizontal direction. That is, by decreasing θ1 (θ1') so as to suppress the moment in the horizontal direction, the tangential plane β can be formed as a plane close to a rising wall. However, in the case of a right and left symmetrical shape of θ2=θ1 (θ2'=θ1'), a contact position with respect to the guide shaft 2A is displaced greatly in the height direction along with an interval shift between the first contact portion T1 (T1') and the second contact portion T2 (T2') caused by the dimension tolerance. Therefore, regarding θ2 (θ2'), the vertical position is ensured with θ2 (θ2') by increasing an angle with respect to θ1 (θ1'). As long as the above-mentioned relationship is satisfied, θ2 may be the same as θ2' (θ2=θ2'). At this time, if θ1=θ1' is established, the first sliding portion S1 and the second sliding portion S2 can be formed so as to be point-symmetrical with respect to the center of the sliding portions.

In the case of this embodiment, the respective first contact portions T1 and T1' of the first sliding portion S1 and the second sliding portion S2 are arranged on a side of supporting moment that acts about the connecting portion 9 in the case where the image reading unit 1 moves in the predetermined direction. Therefore, the image reading device 100 of this embodiment can read (forward scan) an image only in the case where the image reading unit 1 moves in the predetermined direction. On the other hand, in the case where the image reading unit 1 moves in a direction opposite to the predetermined direction to read (back scan) an image, the rotation moment acts in a direction opposite to that of the case in FIG. 3, and hence, the force in the horizontal direction acts on the second contact portion T2 (T2'). Therefore, the second contact portion T2 (T2') can be arranged so as to satisfy F1>F2×tan θ2 (F1'>F2'×tan θ2'), where F2 (F2') represents the force in the horizontal direction at this time. Note that, when θ2 (θ2') satisfies the above-mentioned expression, the angle becomes smaller, and the image reading unit 1 may be displaced greatly in the height direction (gravity direction) due to the dimension tolerance. Therefore, in this embodiment, it is used only for forward scanning, and θ2 (θ2') can be set as large as possible so as not to satisfy F1>F2×tan θ2 (F1'>F2'×tan θ2').

As the distance from the connecting portion 9 to each sliding portion becomes larger, the rotation moment acting on the sliding portion increases. Therefore, the connecting portion 9 can be set at a position in which the distance to each sliding portion is the same or the distance to each sliding portion becomes small so that a difference in rotation moment amount to each sliding portion does not become large. Further, multiple connecting portions may be provided in the movement direction so as to bring each sliding portion close to the connecting portion. However, two sliding portions can be provided on both sides with respect to the connecting portion 9 as in this embodiment.

In the case of this embodiment, shaking of the image reading unit 1 during movement can be suppressed at low cost. That is, the force in the horizontal direction acts due to rotation moment during movement of the image reading unit 1, and hence, the first sliding portion S1 and the second sliding portion S2 are pressed against the guide shaft 2A. At this time, the first contact portion T1 (T1') supporting the force F2 (F2') in the horizontal direction is placed so as to satisfy F1>F2×tan θ1 (F1'>F2'×tan θ1'). Therefore, the image reading unit 1 can be prevented from being lifted due to the force F2 (F2'), and the image reading unit 1 can be prevented from shaking. Particularly, in this embodiment, the respective first contact portions T1 and T1' of the first sliding portion S1 and the second sliding portion S2 are arranged on the side of supporting moment that acts about the connecting portion 9 in the case where the image reading unit 1 performs forward scanning. Therefore, the image reading unit 1 can be more reliably prevented from being lifted during forward scanning. By setting θ1 and θ1' in view of at least one of the distance of each sliding portion from the connecting portion 9 and the distance thereof from the center of gravity G, the image reading unit 1 can be prevented effectively from being lifted due to the force F2 (F2'). Consequently, lateral shaking of the image reading unit 1 does not occur easily, and an image can be read stably.

The position of the first contact portion T1 is merely regulated, and it is not necessary to form a hook portion or a guide surface as in Japanese Patent Application Laid-Open No. 2010-109399. For setting the image reading unit 1 on the guide shaft 2A, the first sliding portion S1 and the second sliding portion S2 may be merely mounted on the guide shaft 2A. Therefore, a setting operation is also simple. The first contact portion T1 (T1') and the second contact portion T2 (T2') are in point contact or line contact with the guide shaft 2A, and hence, the contact area of the first or second sliding portion with respect to the guide shaft 2A is small and the resistance during movement of the image reading unit 1 is low. Therefore, it is not necessary to increase the output of the motor. Consequently, the image reading unit 1 can be prevented from shaking during movement at low cost.

The second contact portion T2 is arranged so as to satisfy θ2>θ1 (θ2'>θ1'), and hence, influence on dimension tolerance can be reduced. Therefore, it is not necessary to set the dimension tolerance strictly, and a device capable of reading an image stably can be obtained at low cost. That is, according to this embodiment, it is possible to obtain an image reading device which does not degrade image quality greatly even when a component dimension is slightly shifted while firmly suppressing rotation moment acting on the bearing member during image reading and scanning with a simple configuration and shape.

Second Embodiment

Figure 8:
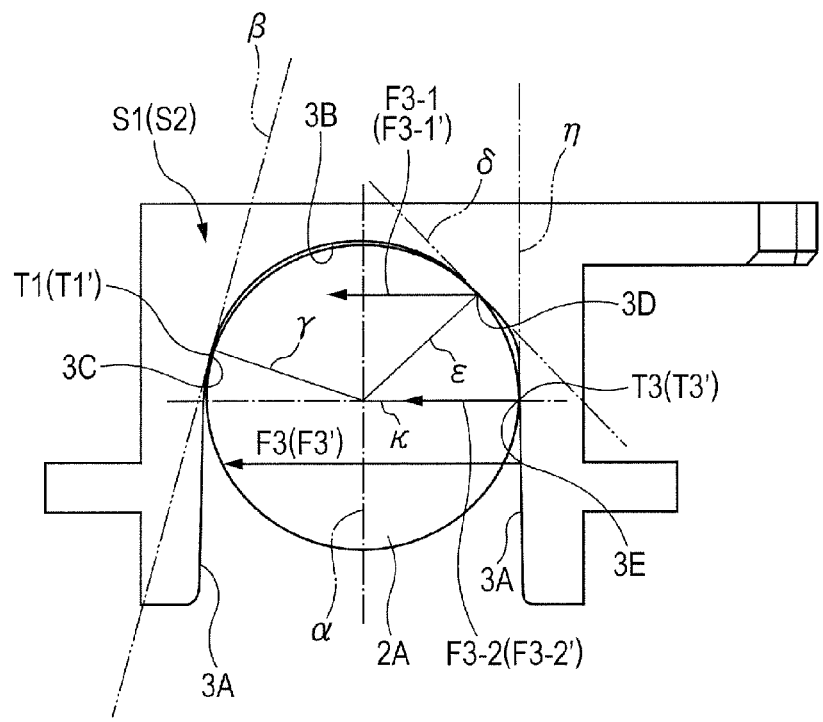
FIG. 8 is a cross-sectional view of an image reading device according to a second embodiment of the present invention, which corresponds to a cross-section taken along the line A-A of FIG. 4.

A second embodiment of the present invention is described with reference to FIG. 8 while referring to FIG. 4. In the case of this embodiment, the first sliding portion S1 and the second sliding portion S2 have a third contact portion T3 (T3') positioned on a side opposite to the side on which the force F2 (F2') acts, separately from the second contact portion T2 (T2'). That is, in addition to the second contact portion T2 (T2'), the third contact portion T3 (T3') is positioned on an opposite side of the first contact portion T1 (T1') with respect to a vertical plane (virtual plane α in the gravity direction) including a center axis of the guide shaft 2A. Therefore, the cylindrical surface 3B is provided with a protruding portion (or a protruding line) 3E protruding inward in a radial direction, in addition to the protruding portions (or the protruding lines) 3C and 3D. The protruding portion (or the protruding line) 3E is placed on a horizontal plane passing through substantially the center axis of the guide shaft 2A in the setting condition with respect to the guide shaft 2A. The third contact portion T3 (T3') that is a contact portion between the protruding portion (or the protruding line) 3E and the outer circumferential surface of the guide shaft 2A is arranged so as to satisfy θ3<θ1 (θ3'<θ1'), where θ3 (θ3') represents an angle formed by a perpendicular line κ with respect to a tangential plane η of the guide shaft 2A and the horizontal direction. In this embodiment, θ3 (θ3') is set to almost 0. Thus, the second contact portion T2 (T2') and the third contact portion T3 (T3') support force F3 (F3-1, F3-2 (F3' (F3-1', F3-2')) acting in the horizontal direction when the image reading unit 1 moves in a direction opposite to the predetermined direction (back scanning).

For example, in the case where F1>F2×tan θ2 (F1'>F2'×tan θ2') is not satisfied, there is a possibility that the second contact portion T2 (T2') alone cannot prevent the image reading unit 1 from being lifted during back scanning. In particular, in the case where rotation moment acting on the sliding portion during back scanning is larger than that during scanning at the time of movement in the predetermined direction (forward scanning), when θ2>θ1 (θ2'>θ1') is satisfied, it is difficult to prevent the image reading unit 1 from being lifted. In this case, it is considered that the image reading unit 1 can be prevented from being lifted by bringing the angle of θ2 (θ2') close to θ1 (θ1'), but the influence by dimension tolerance may be caused easily.

By providing the third contact portion T3 (T3') on the T2 (T2') side in addition to the first and second contact portions T1 and T2 (T1' and T2') as in this embodiment, the lifting of the image reading unit 1 during back scanning can be prevented. That is, during back scanning, the force F3 (F3') occurs with respect to the T2 (T2') side. However, due to the presence of T3 (T3'), F3 (F3') is decomposed into F3-1 (F3-1') acting on T2 (T2') and F3-2 (F3-2') acting on T3 (T3'), and thus, force acting on T2 (T2') becomes small. Therefore, the image reading unit 1 is not lifted during back scanning while keeping the accuracy during forward scanning. If required, the third contact portion of any of the first sliding portion S1 and the second sliding portion S2 may be omitted. For example, the third contact portion of the sliding portion on a side where small moment acts during back scanning may be omitted. The other structure and function are similar to those of the first embodiment.

In each of the above-mentioned embodiments, although description is made of a reading device using a reduced optical system, similar effects can be expected, for example, even with a reading device using a contact image sensor (CIS).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2012-005051, filed Jan. 13, 2012, and No. 2012-259537, filed Nov. 28, 2012 which are hereby incorporated by reference herein in their entirety.

What is claimed is:

1. An image reading device, comprising:
an image reading unit configured to move in a predetermined direction to read an image;
a guide shaft arranged in the predetermined direction and guiding movement of the image reading unit, the guide shaft including at least a partial cylindrical surface on an outer circumference thereof in a movement range of the image reading unit;
a tension member connected to the image reading unit; and
a driving device pulling the tension member to move the image reading unit along the guide shaft, wherein
the image reading unit includes a sliding portion to slide on the guide shaft, and a connecting portion connected to the tension member at a position displaced from the guide shaft at least in a horizontal direction with respect to the predetermined direction,
the sliding portion includes a first contact portion and a second contact portion that come into point contact or line contact with the partial cylindrical surface of the guide shaft above a center axis of the guide shaft in a gravity direction and on both sides with respect to a vertical plane including the center axis of the guide shaft, and
the first contact portion is arranged so as to satisfy F1>F2× tan θ1, where F1 represents a force exerted by gravity of the image reading unit, F2 represents a force acting in the horizontal direction of the image reading unit in a case where the driving device pulls the tension member to move the image reading unit, and θ1 represents an angle formed by the horizontal direction and a perpendicular line with respect to a tangential plane of the guide shaft with which the first contact portion contacts.

2. An image reading device according to claim 1, wherein the second contact portion is arranged so as to satisfy θ2>θ1, where θ2 represents an angle formed by a perpendicular line with respect to a tangential plane of the guide shaft and the horizontal direction.

3. An image reading device according to claim 1, wherein the sliding portion includes, in addition to the second contact portion, a third contact portion positioned on a side opposite to the first contact portion with respect to the vertical plane, the third contact portion is arranged so as to satisfy θ3<θ1, where θ3 represents an angle formed by a perpendicular line with respect to a tangential plane of the guide shaft and the horizontal direction.

4. An image reading device according to claim 1, further comprising:
a second sliding portion,
wherein the sliding portion and the second sliding portion are arranged on both sides with respect to the connecting portion in the predetermined direction.

5. An image reading device according to claim 4,
wherein the first contact portion of the sliding portion and a first contact portion of the second sliding portion are respectively arranged on a side supporting moment that acts about the connecting portion in the case where the image reading unit moves in the predetermined direction, and the first contact portion of the second sliding portion is arranged so as to satisfy $F1'>F2'\times\tan\theta1'$, where $F1'$ represents a force exerted by gravity of the image reading unit, $F2'$ represents a force acting in the horizontal direction of the image reading unit, and $\theta1'$ represents an angle formed by the horizontal direction and a perpendicular line with respect to a tangential plane of the guide shaft with which the first contact portion of the second sliding portion contacts.

6. An image reading device according to claim 5,
wherein the second contact portion of the sliding portion is arranged so as to satisfy $\theta2>\theta1$, where $\theta2$ represents an angle formed by a perpendicular line with respect to a tangential plane of the guide shaft and the horizontal direction, and
a second contact portion of the second sliding portion is arranged so as to satisfy $\theta2'>\theta1'$, where $\theta2'$ represents an angle formed by a perpendicular line with respect to a tangential plane of the guide shaft and the horizontal direction.

7. An image reading device according to claim 6, wherein the first contact portion and the second contact portion of the sliding portion and the first contact portion and the second contact portion of the second sliding portion are arranged so as to satisfy $\theta1=\theta1'$ and $\theta2=\theta2'$.

8. An image reading device according to claim 5, wherein $\theta1\leq\theta1'$ is satisfied when $L1>L2$ is established, where $L1$ represents a distance between the first contact portion of the sliding portion and the connecting portion, and $L2$ represents a distance between the first contact portion of the second sliding portion and the connecting portion.

9. An image reading device according to claim 5, wherein $\theta1\leq\theta1'$ is satisfied when $N1>N2$ is established, where $N1$ represents a distance in the predetermined direction between the first contact portion of the sliding portion and a center of gravity G of the image reading unit, and $N2$ represents a distance in the predetermined direction between the first contact portion of the second sliding portion and the center of gravity G.

10. An image reading device, comprising:
an image reading unit configured to move in a predetermined direction to read an image;
a guide shaft arranged in the predetermined direction and guiding movement of the image reading unit, the guide shaft including at least a partial cylindrical surface on an outer circumference thereof in a movement range of the image reading unit;
a tension member connected to the image reading unit; and
a driving device pulling the tension member with a pulling force in a direction displaced from the guide shaft at least in a horizontal direction to move the image reading unit along the guide shaft, wherein
the image reading unit includes a sliding portion to slide on the guide shaft,
the sliding portion includes a first contact portion and a second contact portion that come into point contact or line contact with the partial cylindrical surface of the guide shaft above a center axis of the guide shaft in a gravity direction and on both sides with respect to a vertical plane including the center axis of the guide shaft, and
the first contact portion is arranged so as to satisfy $F1>F2\times\tan\theta1$, where $F1$ represents a force exerted by gravity of the image reading unit, $F2$ represents a force acting in the horizontal direction of the image reading unit in a case where the driving device pulls the tension member to move the image reading unit, and $\theta1$ represents an angle formed by the horizontal direction and a perpendicular line with respect to a tangential plane of the guide shaft with which the first contact portion contacts.

* * * * *